United States Patent Office 3,426,035
Patented Feb. 4, 1969

3,426,035
HALOGENATION OF AROMATIC COMPOUNDS
Bart J. Bremmer, Midland, Mich., assignor to The Dow Chemical Company, Midland, Mich., a corporation of Delaware
No Drawing. Filed Feb. 3, 1966, Ser. No. 524,833
U.S. Cl. 260—297   9 Claims
Int. Cl. C07d 33/36; C07c 17/00, 25/00

ABSTRACT OF THE DISCLOSURE

The liquid phase nuclear substitution bromination or chlorination of an aromatic compound is carried out at moderate temperatures using a vicinal alkylene oxide as an acid acceptor. The reaction is facilitated by the presence of water. Halogenated derivatives useful as solvents, chemical intermediates, and biocides are thereby produced.

---

This invention relates to an improvement in a broadly known chemical process. It relates particularly to a new and advantageous method for chlorinating and brominating aromatic rings.

In the reaction whereby chlorine or bromine is reacted with an aromatic compound in the liquid phase, usually in the presence of a solvent, to produce the nuclearly halogenated substitution product, for each mole of reacted halogen there is formed a mole of hydrogen halide. This byproduct often complicates the procedure for carrying out the reaction and isolating the desired product. The hydrogen halide is a strong acid which can cause rearrangements or other side reactions and provision must be made during the reaction and subsequent workup procedure for its separation and disposal or recovery. The highly corrosive nature of the hydogen halide imposes severe limitations on process equipment design.

It is known to use inorganic acid acceptors to react with and neutralize hydrogen halide as it is produced during a reaction. Alkali metal and alkaline earth metal oxides, hydroxides, and carbonates or other salts of weak acids have been used and are effective for the purpose. However, these inorganic compounds as well as the resulting halide salts are usually insoluble in the organic reaction mixture and so are hard to keep evenly dispersed in the reaction mixture, cause plugs or unwanted deposits in apparatus, and so on. The more or less strongly basic properties of the acid acceptor may also adversely affect the organic reaction.

These difficulties are avoided and other advantages are obtained when the liquid phase chlorination or bromination of an aromatic nucleus is carried out in the presence of at least a sufficient amount of a vicinal epoxide of 2 to about 8 carbon atoms to react with the hydrogen halide produced during the halogenation. The organic epoxide, being generally compatible with the starting material to be halogenated, serves as both a reaction solvent and a hydrogen halide acceptor. The normally liquid halohydrin product is a neutral substance which can also serve as a reaction medium and which has the added advantage of being easily regenerated to the starting epoxide by reaction with a base.

Organic epxoides are regarded as relatively reactive compounds. However, the present process has been found to proceed satisfactorily at a temperature of −20° C. to about 75° C. in most cases without substantial reaction of the epoxide or its halohydrin product. Bromination has been found to yield the best results when carried out at temperatures within the lower part of the stated range, for example, about −20° C. to about 40° C. Chlorination usually requires slightly higher temperatures for good results, preferably about 30–75° C. Both chlorination and bromination according to the present process are carried out at significantly lower temperatures than are usually practical to use with conventional halogenation solvents. Products having better color and, sometimes, different isomer distribution or higher purity than those of known processes are thereby obtainable.

Epoxides useful in the improved process are alkylene oxides of 2 to about 8 carbon atoms. By the term alkylene oxide is meant aliphatic hydrocarbon epoxides such as ethylene oxide, propylene oxide, isobutylene oxide, 1,2-penteneoxide, diisobutylene oxide, and butadiene dioxide; closed chain or cyclic alkylene oxides such as cyclohexene oxide and vinylcyclohexene oxide; and substituted epoxides including halogen, derivatives and epoxy ethers such as epichlorohydrin, epibromohydrin, butyl glycidyl ether, phenyl glycidyl ether, diglycidyl ether, allyl glycidyl ether, styrene oxide and the like. Epoxides of relatively low molecular weight and moderate boiling point are preferred, for example, propylene oxide, butylene oxide, and epichloro hydrin.

At least sufficient epoxide is employed to react with the hydrogen halide liberated during the reaction, i.e., at least about one mole of epoxy group per mole of reacted halogen. It is usually preferred to use somewhat more than this theoretical minimum, for example, about 1.5–10 moles of epoxy group per mole of halogen. More epoxide can be used, but such excess is usually less convenient because of undue dilution of the reaction mixture. The epoxide may be diluted with another solvent which is unreactive in the process.

The reaction is facilitated by the presence of a small amount of water in the reaction mixture. While trace amounts have some beneficial effect, it is preferred to use about 0.01–1.0 mole of water per mole of alkylene oxide.

This improved process is applicable to the chlorination or bromination of any carbocyclic or heterocyclic nucleus having aromatic characteristics and having at least one normally reactive nuclear hydrogen substituent, i.e., normally replaceable by chlorine or bromine under conventional halogenation conditions using an inert halogenation solvent. Illustrative compounds which can be halogenated by the present process include aromatic carbocylic hydrocarbons such as benzene, naphthalene, toluene, xylene, biphenyl, ethylnaphthalene, and the like; and also derivatives of these having halogen, ether, carbonyl, and hydroxy substituents so long as there is present at least one reactive hydrogen atom on the aromatic nucleus. Such derivatives include halogenated hydrocarbons such as chlorobenzene, chloronaphthalene, and bromobiphenyl; aromatic ethers such as anisole and diphenyl ether; carbonyl compounds such as salicylic acid, benzophenone, methyl salicylate, acetanilide and salicylanilide; and monohydric and polyhydric phenols such as phenol, cresol, naphthol, resorcinol, oxydiphenol, p,p'-isopropylidenediphenol, and the like. Also halogenated by the present process are oxygen, nitrogen, and sulfur heterocycles and derivatives as above whose rings are aromatic in character and which are chlorinated or brominated by conventional halogenation in a solvent. Such heterocyclic aromatic compounds include quinoline, thiophene, pyrrole, furan, coumarone, indole, and such substituted derivatives as picoline, methylquinoline, pyridinol, hydroxythiophene, chloroquinoline, and the like.

As is well known in the art, while chlorination is accomplished by using elemental chlorine in a halogenation reaction, bromination can be effected with either bromine or the so-called bromine chloride which corresponds to the formula BrCl. Thus in the present process, a mole of BrCl may be employed as the equivalent of a mole of bromine to obtain similar results.

Example 1

A mixture of 50.7 g. of methyl salicylate, 154.2 g. of epichlorohydrin, and 3.8 g. of water was prepared in a reaction flask. This mixture was stirred at 24–26° C. while 106.6 g. of bromine was added portionwise in one hour. After the bromine had been added, the precipitated white crystals of methyl 3,5-dibromosalicylate were filtered out and washed with water. This product amounted to 98 g. and represented 94.2 percent of the theoretical yield.

Example 2

Example 1 was repeated except for using 97 g. of propylene oxide as the reaction medium in place of epichlorohydrin. A total of 98.5 g. of white, crystalline methyl 3,5-dibromosalicylate was precipitated from the reaction mixture and was recovered as in Example 1. The quality of the product was essentially the same as that of the foregoing example.

Example 3

A quantity of 106.6 g. of bromine was added portionwise to a stirred mixture of 46 g. of salicylic acid, 154 g. of epichlorohydrin, and 2.5 g. of water at about 25° C. over a one hour period. When half of the bromine had been added, corresponding to a monobrominated product, the reaction mixture was a homogeneous solution. The product, 5-bromosalicylic acid, could be recovered at this point by distilling off the solvent or by precipitating the product by adding water. After all of the bromine had been added, most of the 3,5-dibromosalicylic acid product had precipitated and was recovered by filtration. The washed and dried precipitate amounted to 83 grams and melted at 221–223.5° C.

Example 4

Following the procedure of the above examples, chlorine was sparged into a mixture of 50.7 g. of methyl salicylate, 154.2 g. of epichlorohydrin, and 3.8 g. of water at 30–35° C. until the theoretical amount of chlorine for dichlorination had been absorbed. The precipitated methyl 3,5-dichlorosalicylate was filtered off, washed, and dried to obtain 63.4 g. of white crystalline product, M.P. 144–146° C.

Example 5

Salicylic acid was dichlorinated by sparging chlorine into a mixture of 69 g. of salicylic acid, 232 g. of epichlorohydrin, and 5.8 g. of water at 53–56° C. until the theoretical quantity of chlorine had been absorbed. A yield of 82 g. of light yellow 3,5-dichlorosalicylic acid, M.P. 217–220° C., was filtered from the reaction mixture.

Example 6

A mixture of 53.3 g. of salicylanilide, 267.8 g. of epichlorohydrin, and 13 g. of water was stirred at about 25° C. while 120 g. of bromine was added portionwise in about one hour. The precipitated crystalline product was filtered from the reaction mixture, washed, and dried to obtain 95.2 g. of material which assayed 98.0 percent by weight of 3,4′,5-tribromosalicylanilide, the remainder being largely 3,5-dibromosalicylanilide.

When the procedure of this example is repeated using a conventional solvent in place of the epoxide, a significantly lower yield of the desired product is usually obtained. For example, when this bromination is run in aqueous ethanol, yields of 3,4′-5-tribromosalicylanilide run no higher than about 85 percent at best.

Example 7

Example 6 was repeated using butylene oxide as the reaction medium. The precipitated product assayed 95.0 percent 3,4′,5-tribromosalicylanilide.

Example 8

Salicylanilide was brominated as in Example 6 but operating under anhydrous conditions with a smaller amount of reaction solvent. In the experiment, 120 g. of bromine was added at 25° C. in about one hour to 53.3 g. of salicylanilide in 116 g. of epichlorohydrin. Upon working up the resulting reaction mixture as previously described, 89.5 percent of the theoretical quantity of 3,4′,5-tribromosalicylanilide was obtained as a crude product of 93 percent assay.

Example 9

A mixture of 71.6 g. of anisole and 6.2 g. of water in 122.2 g. of epichlorohydrin was stirred at 24–26° C. while about 127 g. of bromine was added over one hour. A persistent red color then indicated incomplete reaction of the bromine so the temperature of the reaction mixture was raised to 45° C. and bromine addition was continued (to a total of 211 g.) and completed in 95 minutes. After stirring for 40 minutes at the higher temperature, the epichlorohydrin was stripped off under reduced pressure and the remaining mixture was poured into cold water to precipitate 77.8 g. of crude 2,4-dibromoanisole, a brown solid melting at 59.5–61° C. Washing with ethyl alcohol converted the product to a white solid, M.P. 60–62° C.

Example 10

A mixture of 40.7 g. of 2,6-dimethyl-4-pyridinol, 123.2 g. of epichlorohydrin, and 6.2 g. of water was stirred at a beginning temperature of 25° C. while 106.6 g. of bromine was added in dropwise fashion. During the addition of bromine, the temperature was allowed to rise to 37° C. and 75 g. of epichlorohydrin and 3.8 g. of water were added to the reaction mixture to obtain respectively more rapid reaction and better stirring. Bromine addition was complete in 1.5 hours and the mixture was stirred at the reaction temperature for an additional 30 minutes. The reaction mixture was worked up as described in Example 9 to obtain 82.0 g. of 3,5-dibromo-2,6-dimethyl-4-pyridinol, a brown solid analyzing 56.1 percent Br, calculated 56.9 percent Br.

I claim:

1. In a process wherein an aromatic compound selected from the group consisting of mono- and di-carbo-cyclic aryl hydrocarbons and substituted derivatives thereof wherein the substituents are halogen, hydroxy, methoxy, phenoxy, carboxy, carboxymethyl, phenylcarbonyl, carboxanilide, hydroxyphenoxy, hydroxyphenylisopropyl and acetamido or a heterocyclic aromatic compound selected from the group consisting of quinoline, thiophene, pyrrole, furan, pyridine, coumarone and indole and substituted derivatives of said heterocyclic compound wherein the substituents are methyl, hydroxy and chloro having at least one normally reactive nuclear hydrogen substituent is contacted in the liquid phase with a halogen which is chlorine, bromine chloride, or bromine at −20° C. to 75° C. in the presence of an acid acceptor, the improvement wherein said acid acceptor is at least one mole of a vicinal epoxide of 2–8 carbon atoms per mole of said halogen.

2. The process of claim 1 wherein the reaction mixture additionally includes 0.01–1.0 mole of water per mole of epoxide.

3. The process of claim 1 wherein the halogen is bromine.

4. The process of claim 1 wherein the halogen is chlorine.

5. The process of claim 3 wherein the epoxide is epichlorohydrin.

6. The process of claim 1 wherein the epoxide is propylene oxide.

7. The process of claim 1 wherein the epoxide is butylene oxide.

8. The process of claim 6 wherein there is present 0.01–1.0 mole of water per mole of epoxide.

9. The process of claim 8 wherein the aromatic compound is salicylic acid, methyl salicylate, salicylanilide, anisole, or 2,6-dimethyl-4-pyridinol.

References Cited

UNITED STATES PATENTS

| | | | |
|---|---|---|---|
| 3,149,156 | 9/1968 | Majewski | 260—559 |
| 3,149,157 | 9/1968 | Majewski et al. | 260—559 |

JOHN D. RANDOLPH, *Primary Examiner.*

A. L. ROTMAN, *Assistant Examiner.*

U.S. Cl. X.R.

260—283, 289, 290, 332.3, 332.5, 313.1, 319.1, 326.16, 469, 520, 521, 612, 623, 559, 613, 346.1, 346.2, 347.8, 649, 650, 591, 562, 326.5, 473